United States Patent

[11] 3,541,919

[72] Inventor Adolf Weyrauch
 Wetzlar, Germany
[21] Appl. No. 808,162
[22] Filed March 18, 1969
[45] Patented Nov. 24, 1970
[73] Assignee Carl Zeiss Stiftung doing business as Carl
 Zeiss
 Wuerttemberg, Germany
 a corporation of Germany
 Continuation-in-part of Ser. No. 440,354,
 Mar. 15, 1965, abandoned.

[54] VIEW FINDER FOR A REFLEX CAMERA
 INCLUDING A ROOF PRISM
 10 Claims, 11 Drawing Figs.
[52] U.S. Cl. .................................................. 88/1.5
[51] Int. Cl. ............................................ G03b 13/02
[50] Field of Search ....................................... 88/1.5

[56] References Cited
 UNITED STATES PATENTS
2,988,973 6/1961 Bolm et al. .................... 95/31
3,125,623 3/1964 Leitz et al. .................... 356/8

FOREIGN PATENTS
166,197 6/1950 Austria .........................
950,571 11/1953 France .........................

Primary Examiner—Ronald L. Wibert
Assistant Examiner—Orville B. Chew, II
Attorney—Singer, Stern & Carlberg ABSTRACT: A prism system for a view finder of a mirror reflex camera having an exceptional small size and which is composed of at least two prisms cemented together and in addition to a light admitting and a light exit surface has a first reflecting surface and a second reflecting surface. The latter is arranged in the plane of the cemented surface. The cemented surface comprises three sections all arranged in a single plane; one section of which transmits a portion of the entering light which together with the other portion goes to the first reflecting surface formed by two roof faces arranged on one of the two prisms; another section is formed by a dielectric layer which reflects a portion of the light reflected by the first reflecting face toward the light exit surface, while the third section of said cemented surface does not admit any light rays into said prism system and is fully reflective.

Patented Nov. 24, 1970
3,541,919
Sheet 1 of 4
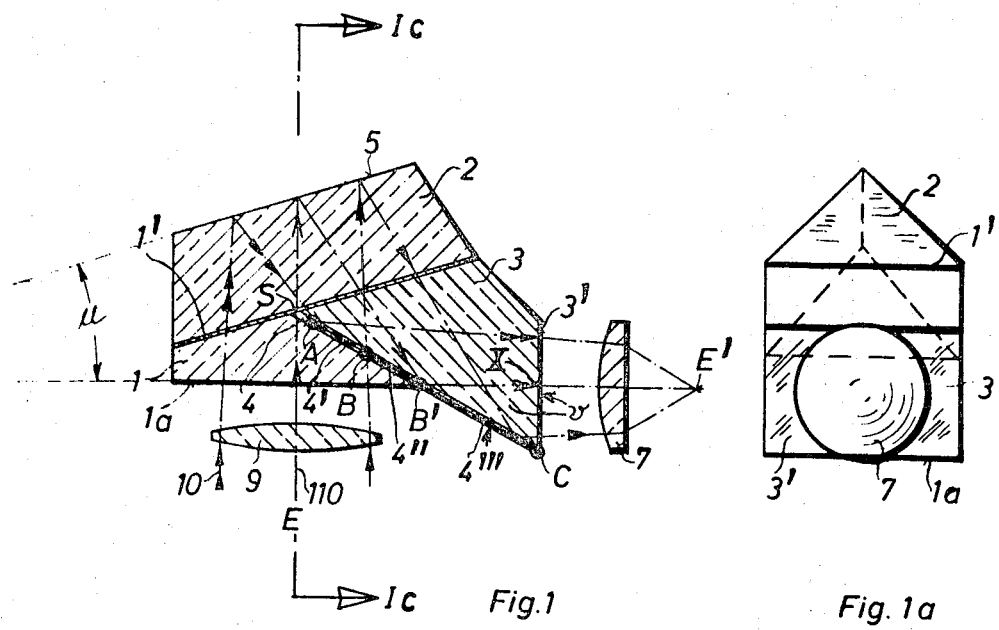
Fig.1
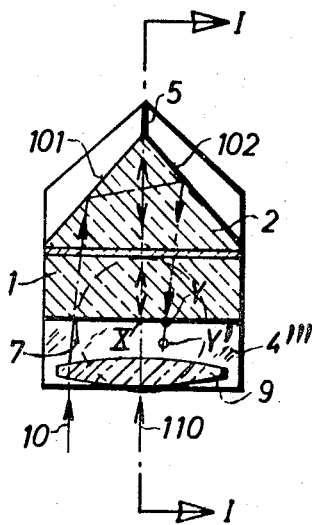
Fig. 1a
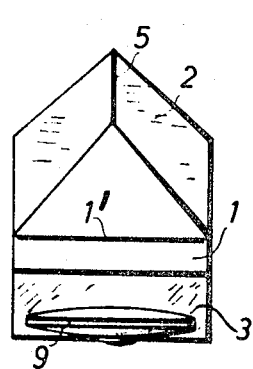
Fig. 1b
Fig. 1c

3,541,919

VIEW FINDER FOR A REFLEX CAMERA INCLUDING A ROOF PRISM

The invention relates to a prism system, particularly to a view finder prism system for mirror reflex cameras and constitutes a continuation-in-part of application Ser. No. 440,354 filed Mar. 15, 1965 now abandoned. The prism system is of the type having two reflecting faces of which the first one is formed by a roof having two roof surfaces and in which furthermore the entering light rays are directed already by said first reflecting face in the direction toward a light exit face and in which the prism system comprises at least two parts. The known prism systems of this type have the advantage that the length of the path of the light rays as a result of the particular direction of the light rays within the prism system is very short and therefore the view finder image can be viewed very greatly enlarged.

In these known prism systems are provided, however, air gaps between the individual parts for the purpose of preventing a disturbance of the total reflection. These air gaps have, however, the disadvantage that the size of the entire prism system cannot be reduced below a predetermined limit. It is namely not possible to arrange the roof comprising two roof surfaces any desired short distance away from the second reflecting face, because of the fact that it may happen that a total reflection of the light rays may occur on said second reflecting face when the light rays pass from one surface of the roof to the other surface.

It is an object of the invention to produce a prism system of the type mentioned which in size is smaller than the known prism system and in which the length of the path of the light rays within the prism system is still shorter than in the known prism systems.

This object of the invention is attained by cementing the parts of the prism system to one another in such a manner that the second reflecting face lies at least partly in a cemented face, and that furthermore a dielectric layer is disposed at least in part in this cemented face, whereby this dielectric layer is traversed by a portion of the light rays entering the prism system, said dielectric layer directing a portion of the light rays which is reflected by the first reflecting face toward the light exit face. The refraction index $n_s$ of said dielectric layer is $< n_g ** \sin e$, while the thickness of said layer is $d > \lambda/2$, in which $n_g$ is the refraction index of the prism glass, $e$ the smallest angle of incidence of the light rays which meet the reflecting face, while $\lambda$ is the shortest wave length of the employed light. When the prism system has this construction, the result is that the light rays which enter the prism system will pass through the dielectric layer or the transparent cemented face without causing any disadvantageous result, whereby the dielectric layer reflects, however, the light rays after their reflection on the first reflecting face, namely on the two roof surfaces, without loss of light into the following ocular. In this novel construction of the prism system the roof surfaces may be disposed substantially closer to the second reflecting face than heretofore so that the length of the path of the light rays will within the prism system be shorter. In fact, the roof may extend over a plurality of prism parts, provided that in such an arrangement the refraction index of the cement is greater or the same than the refraction index of the glass.

According to a first embodiment of the invention the prism system consists of three parts of which one is provided with a roof composed of two roof surfaces forming between the same a right angle, while the two other two parts have a light admitting surface and a light exit surface, respectively. The dielectric layer is disposed between the two last mentioned parts.

According to a second embodiment of the invention the prism system consists only of two prism parts and the mentioned roof extends over both of these prism parts. A portion of the entering light rays passes according to the invention through the second reflecting face directly after having entered the prism system. The second reflecting face directs the light rays coming from the first reflecting face into the light exit face. That portion of the second reflecting face which is not penetrated by the incoming light rays according to a further development of the invention may be made fully reflective. In the event that the second reflecting surface is partly arranged in air this portion of the reflecting surface need not be made fully reflective because it is already fully reflective.

Preferably, one of the prism parts is provided with two faces of which one forms the light admitting surface while the other serves for the admission of a further beam of light which passes in a straight line through the prism system. This other face may, for instance, be used for projecting a light beam coming from an exposure meter into the view finder image.

The prism system of the invention has the advantage and distinction that its light exit surface may be made rectangular. The advantage is that, for instance, the shape of the view finder area is easier to observe and that in addition thereto sufficient space is available to indicate, for example, the exposure value separate from the view finder image.

The accompanying drawing illustrates several embodiments of prism systems of the invention, as follows:

FIG. 1 illustrates a vertical sectional view of a first embodiment along the line I–I of FIG. 1c;

FIG. 1a is a view of the complete first embodiment from the right in FIG. 1;

FIG. 1b is a view from the left in FIG. 1;

FIG. 1c is a sectional view along the line 1c—1c of FIG. 1;

FIG. 2a is a view from the right in FIG. 2;

FIG. 2b is a view from the left in FIG. 2;

FIG. 3a is a view from the right in FIG. 3;

FIG. 3b is a view from the left in FIG. 3; and

Figure 2:
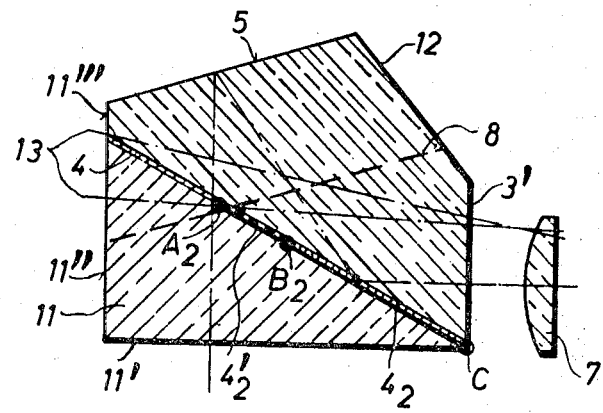
FIG. 2 illustrates a vertical sectional view of a second embodiment.
Figure 2:
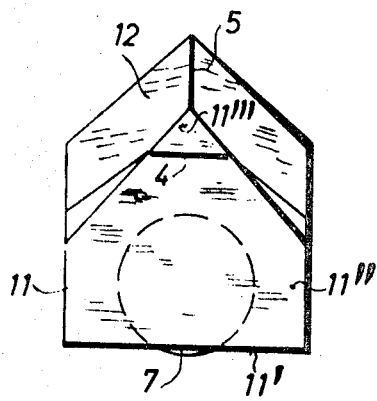
Figure 2:
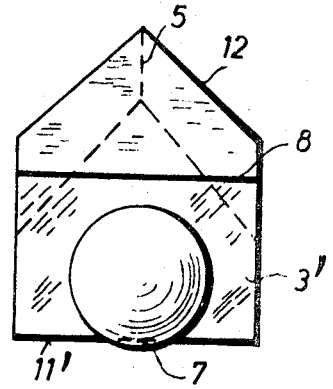

Referring to FIG. 1, the prism systems consist of three parts 1, 2 and 3, which are cemented to one another as shown. The prism part 1 has a horizontal light entrance surface 1a and two oppositely inclined top surfaces to one of which a portion of the base surface of the second prism part 2 has been cemented, while the other inclined surface of part 1 has cemented thereto a portion of the inclined base surface of the prism part 3 which is provided with a vertical light exit surface 3'. The inclined top surface of the prism part 3 is disposed in the same inclined plane as the base surface of the prism part 2 and is cemented to the same. The prism part 2 comprises a roof edge prism whose roof consists of two roof faces which are arranged at a right angle to each other. These two roof faces in the following description and in the claims are designated with "first reflecting face" while the layer 4 between the prism part 1 and 3 and consisting in part of transparent cement is designated with "second reflecting face".

Referring to the FIGS. 1 and 1c a light ray 10 while passing upwardly through the field lens 9 is somewhat bent and then passes through the prism part 1, the layer 1' and in the prism part 2 is reflected by the roof surface 101 toward the other roof surface 102. The latter reflects the light ray downwardly onto the cemented face indicated by the layer 4 which extends between the points S and B'. Within the plane of the cement layer 4 is disposed between the points A and B a dielectric layer 4' having an index of refraction $n_s < n_g ** \sin e$ and a thickness $d > \lambda/2$, wherein $n_g$ indicates the index of refraction of the prism glass; $e$ the smallest angle of incidence of the light rays when striking the dielectric layer after being reflected by the two surfaces of the roof 5, and $\lambda$ denotes the median wave length of the light passing through the prism system. The dielectric layer 4' permits the light rays passing through the prism part 1 to pass through it without any difficulties and reflects all light rays reflected by the prism part 2, namely, by the roof faces of the same, and reflects the rays of the light exit face 3' into the following eyepiece 7. The extension 4" of the cement layer 4 between the points B and B', through which no light rays enter the prism system is fully reflective. Furthermore, for manufacturing reasons, the extension layer 4''' between the points B' and C, which is arranged in air, may also be made fully reflective. The layer 4 which includes the layers 4', 4'' and 4''' constitute the "second reflecting face" of the prism system. The refractive index of the cement in the cemented surfaces is equal or greater than that of the glass from which the prism parts are made.

Another light ray 110 which passes along the axis of the lens 9 extends to the edge of the roof 5, where it is reflected. The ray 110 is not laterally displaced, but is directed downwardly and is reflected at the point X into the prism part 3 and horizontally outwardly.

If the prism system of the invention is to be employed as a view finder in a miniature camera in which the view finder image is to appear enlarged as great as possible, it is of advantage when the angle $u$ between the horizontal light entrance face 1a and the edge of the roof 5 is about 15°. The angle Y between the second reflecting face and the light exit surface, when a right angular deflection of the optical axis E-E' is desired, is selected to be $45° + u$; that is, in the present example about 60°. In this example the light entrance face and the light exit face would be at a right angle to each other.

FIG. 2 illustrates another prism system of the invention which consists of two prism parts 11 and 12. The roof 5 as shown consists of two surfaces disposed at a right angle to each other and extends over both prism parts. The broken line 8 indicates the intersection lines of the roof surfaces with the prism body. The dielectric layer $4'_2$, similar to the embodiment of FIG. 1, is disposed between the points $A_2$ and $B_2$. The prism parts 11 and 12 are united by means of a cement layer 4 and $4_2$ whose index of refraction is greater or equal to the index of refraction of the prism glass, so that before the reflection of the light rays from the two roof surfaces no light ray deflection on the cemented face $4_2$ takes place.

The passage of the light rays is similar to the one described in connection with FIG. 1.

The prism part 11 in addition to the light admitting face 11' is provided with a second light admitting face 11'' extending at a right angle to the first one and through which may enter, for example, a light beam 13 coming from an exposure meter. This light beam 13 passes in a straight line through the prism without any deflection. The surface 11''' of the prism 12 which forms a continuation of the surface 11'' may be used also for this first mentioned purpose.

Figure 3:
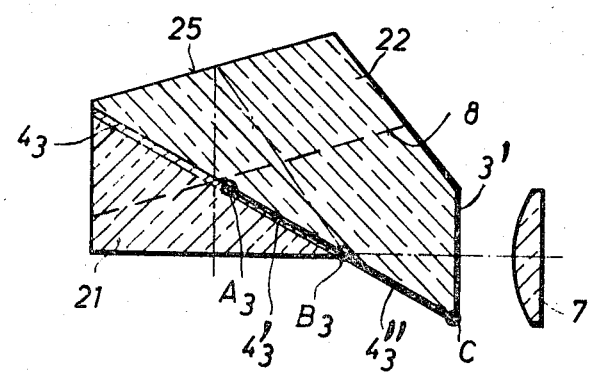
FIG. 3 illustrates a vertical sectional view of a third embodiment.
Figure 3:
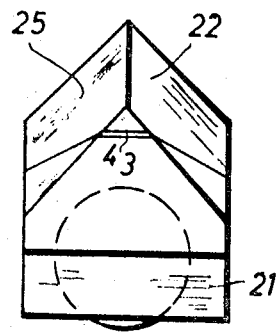
Figure 3:
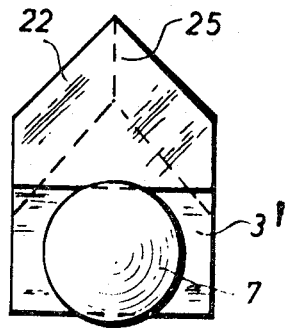

In FIG. 3 is illustrated still another prism system of the invention which consists of two parts 21 and 22 and which are united with one another by a high refractive cement.

In the plane of the cement layer $4_3$ is disposed between the points $A_3$ and $B_3$ the dielectric layer 4 of the invention. Preferably, the exterior surface portion $4''_3$ is not made reflective, because it is already totally reflective.

The two roof surfaces of the roof 25 again extend over both prism parts 21 and 22. The operation of this prism system is the same as the two prism systems described previously.

Figure 4:
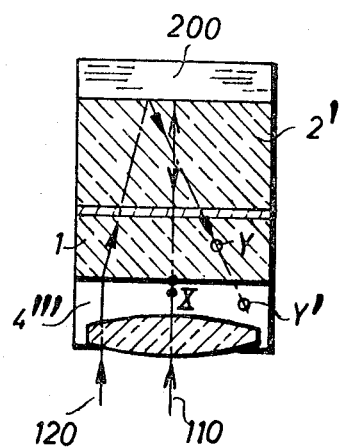
FIG. 4 illustrates a vertical sectional view of a fourth embodiment.

FIG. 4 illustrates an embodiment in which the roof faces 101 and 102 are replaced by a single plane reflecting surface 200. The path of the light rays will be substantially the same, except that the ray reflected by the surface 200 is not laterally displaced but is deflected inclined rearwardly. The axial ray 110 does not change during its passage through the prism system. Only the lateral ray 120 is reflected as shown.

I claim:

1. A prism system for a view finder particularly for use in a mirror reflex camera, said prism system being provided with a light admitting surface, a light exit surface and a first and a second reflecting face of which the first light reflecting surface is formed by two roof surfaces arranged at a right angle to each other and in which the light rays entering said light admitting surface are reflected by said first reflecting surface onto said second reflecting face and by the latter are reflected toward said light exit surface of the prism system, said prism system comprising three prism parts which are cemented to each other and of which one part is provided with said roof surfaces, while the other two are provided with said light admitting surface and said light exit surface, respectively, said light admitting surface being disposed at an angle to said first reflecting surface, and a dielectric layer disposed in the plane of the cemented surface between said two last mentioned prism parts, said dielectric layer being traversed by a portion of the light rays entering said prism system and directing a portion of the light rays reflected by said first reflecting face toward said light exit face, the refractive index $n_s$ of said dielectric layer being $< n_g ** \sin e$ and its thickness $d > \lambda'2$; wherein $n_g$ is the refractive index of the prism glass, and $e$ is the smallest angle of incidence of the light rays which come from said first reflecting face and meet said dielectric layer, while $\lambda$ is the shortest wave length of the light passing through the prism system.

2. A prism system for a view finder, particularly for use in a mirror reflex camera, said prism system being provided with a light admitting surface, a light exit surface and a first and a second reflecting face of which the first reflecting face is formed by two roof surfaces arranged at a right angle to each other and in which the light rays entering said light admitting surface are reflected by said first reflecting face in a direction toward said light exit face of the prism system, said prism system comprising at least two prism parts one of which having said light admitting surface arranged at an angle to said first reflecting face, while the other one having said light exit surface, said two parts being cemented to one another to form a cemented surface having three sections arranged in a single plane, namely, a first section S-A through which solely pass some of the entering light rays, a second center section A-B which is penetrated from one side by some of the entering light rays and on which the light rays reflected by said first reflecting face are reflected, and a third section B-B' which solely reflects light rays coming from said first reflecting face, said second reflecting face being formed by a portion of said second section and said entire third section, a dielectric layer being arranged within the plane of said second section of said cemented surface, said dielectric layer having a refraction index $n_s < n_g ** \sin e$ and having a thickness $d > \lambda/2$, wherein $n_g$ is the refractive index of the prism glass, $e$ is the smallest angle of incidence of the light rays coming from said first reflecting face and striking said dielectric layer, and $\lambda$ is the shortest wave length of the light passing through the prism system, said third section B-B' of said cemented face being totally reflective.

3. A prism system according to claim 2, in which only that portion of said second reflecting face which is used for the reflection of the light rays coming from said first reflecting face is totally reflective.

4. A prism system according to claim 2, in which only that portion of the second reflecting face which is disposed within the prism system and which is used for the reflection of the light rays coming from said first reflecting face is totally reflective.

5. A prism system according to claim 1, in which the refractive index of the cement in the cemented surfaces is greater than that of the prism glass.

6. A prism system according to claim 1, in which the refractive index of the cement in the cemented surfaces is equal to that of the prism glass.

7. A view finder prism according to claim 2, in which one of said prism parts is provided with two surfaces of which one forms said light admitting surface and the other serves for the admission of another beam of light which passes in a straight line through said prism system.

8. A prism system according to claim 1, in which said light exit surface of the prism is rectangular.

9. A prism system according to claim 2, in which said prism system comprises two parts which are cemented together along a plane which contains said three sections, and that said prism part provided with said first reflecting face extends with its roof surfaces over both parts and is provided with said light exit surface.

10. A prism system according to claim 1, in which said light admitting surface and said light exit surface are disposed at a right angle to each other, that the angle between said light admitting surface and the edge along which the two roof surfaces meet is about 15°, and that the angle between said second reflecting face and said light exit surface is about 60°.